United States Patent [19]
Simmons

[11] 3,884,127
[45] May 20, 1975

[54] FRANGIBLE CONSTRUCTION AND ACTUATOR UTILIZING SAME

[75] Inventor: William D. Simmons, Costa Mesa, Calif.

[73] Assignee: Bertea Corporation, Irvine, Calif.

[22] Filed: Jan. 29, 1973

[21] Appl. No.: 327,747

[52] U.S. Cl. ............... 92/151; 91/411. A; 92/193; 92/251
[51] Int. Cl. ............................................. F01b 7/00
[58] Field of Search ............ 92/151, 249, 250, 251, 92/193, 172; 91/411 A, 411 B

[56] References Cited
UNITED STATES PATENTS

| | | | |
|---|---|---|---|
| 1,569,560 | 1/1926 | Miller | 92/250 X |
| 1,772,565 | 8/1930 | McKone | 92/249 X |
| 3,242,822 | 3/1966 | Barltrop | 91/411 B X |
| 3,411,410 | 11/1968 | Westbury et al. | 91/411 B X |
| 3,442,183 | 5/1969 | Howe et al. | 92/193 X |
| 3,543,642 | 12/1970 | Seamone | 92/151 X |
| 3,656,414 | 4/1972 | Müller | 92/193 X |
| 3,698,264 | 10/1972 | York | 92/151 X |

*Primary Examiner*—Martin P. Schwadron
*Assistant Examiner*—Abraham Hershkovitz
*Attorney, Agent, or Firm*—Gordon L. Peterson

[57] ABSTRACT

An actuator system for use in an aircraft comprising first and second actuators. The first actuator includes a housing having a chamber and a piston movable in the chamber. A connecting rod is joined to the piston and projects through an aperture in a transverse member of the housing. The connecting rod of the first actuator and the second actuator are drivingly interrelated to an output member so that either the piston or the second actuator can move the output member. Peripheral regions of the piston and the transverse member are frangible.

30 Claims, 12 Drawing Figures

PATENTED MAY 20 1975
3,884,127
SHEET 1 OF 2
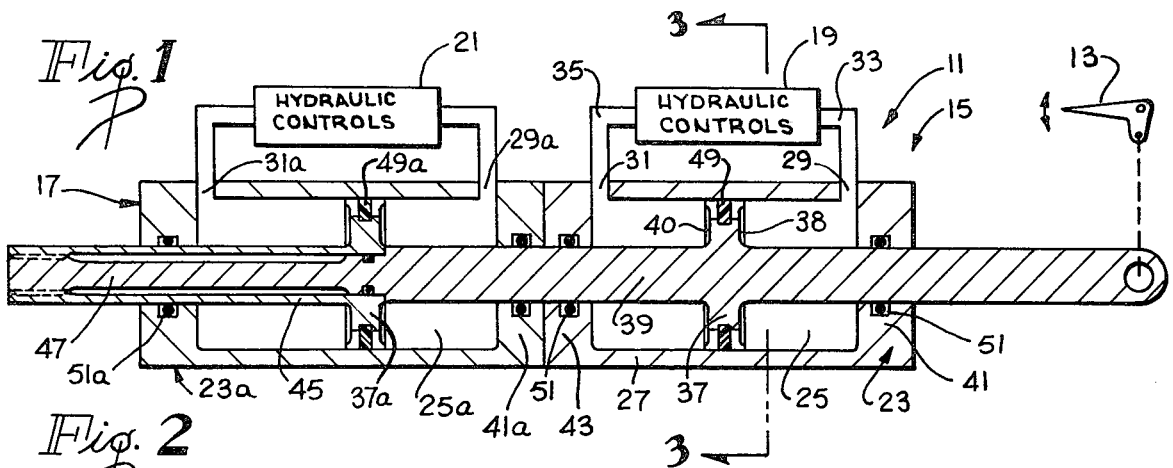
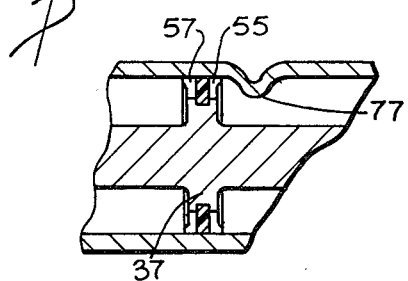
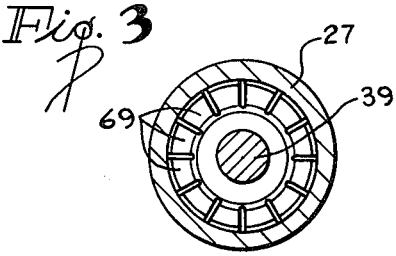
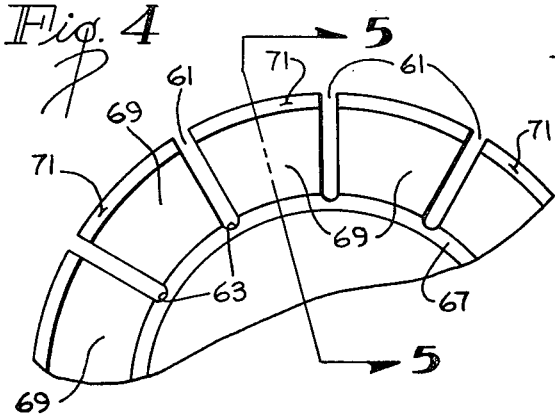
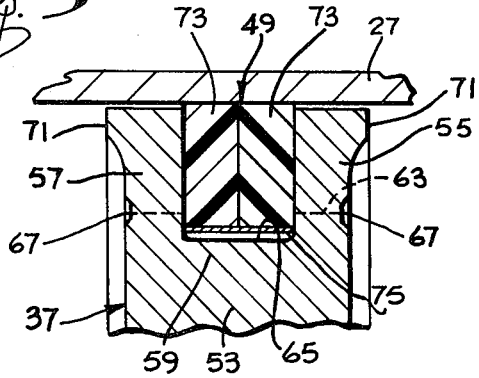
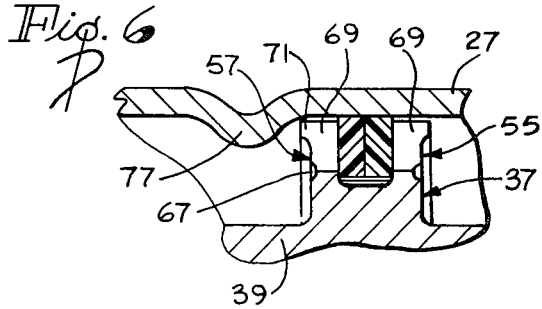
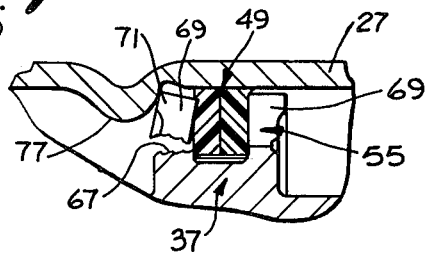

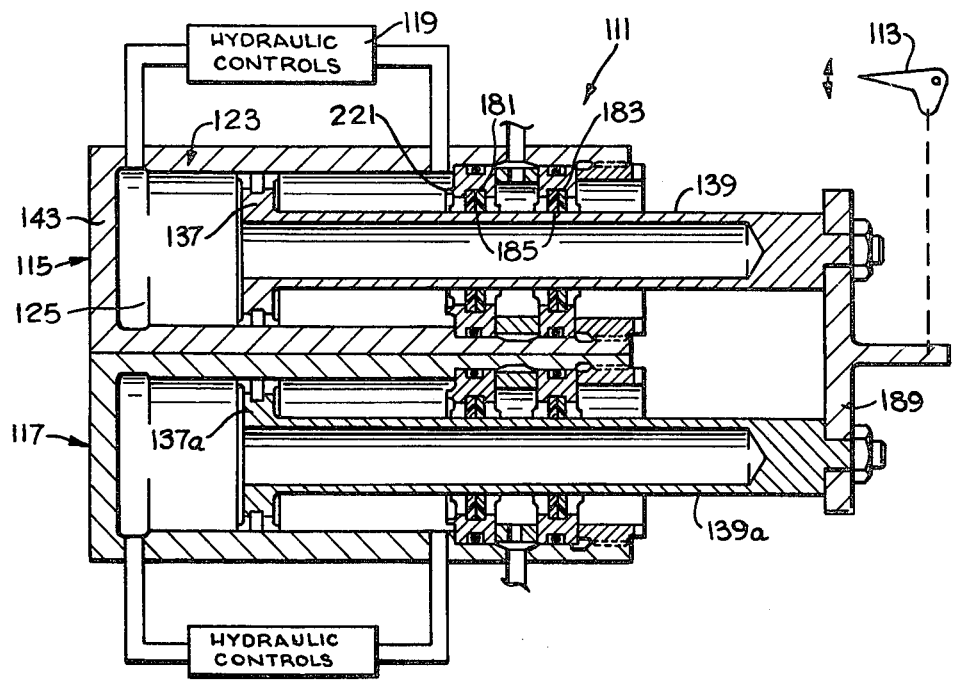
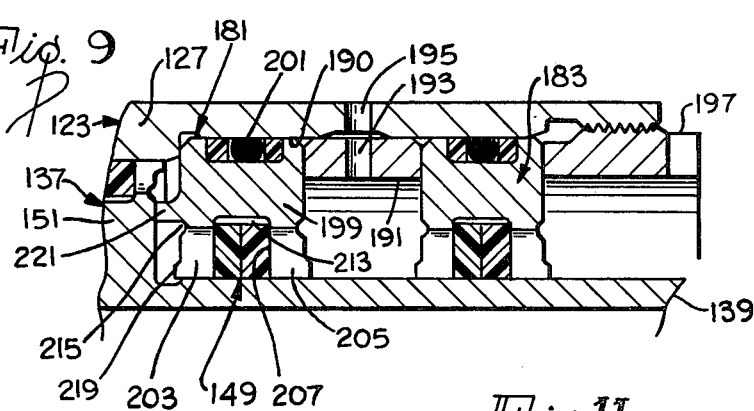
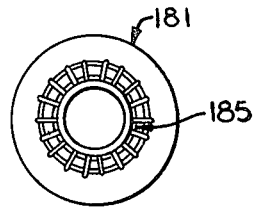
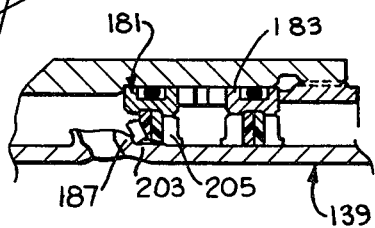
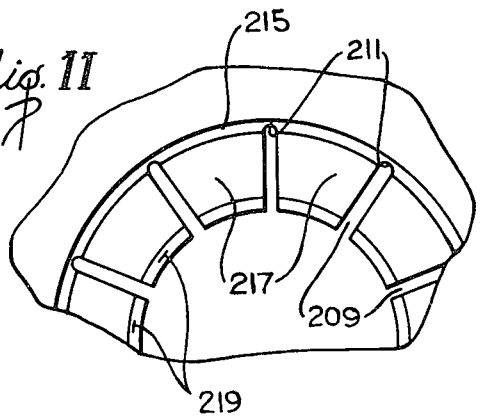

FRANGIBLE CONSTRUCTION AND ACTUATOR UTILIZING SAME

BACKGROUND OF THE INVENTION

Piston cylinder actuators are commonly used to drive or position various output members. For example, actuators of this type are frequently employed in aircraft to position the control of the aircraft.

In aircraft applications suitably interrelated dual actuators are employed for reasons of safety. If one actuator fails, the other actuator positions the control surface. However, because the pistons of the two actuators are movable together, if the movement of one piston is restricted or prevented, neither actuator can function properly.

One kind of damage to one actuator which can lead to malfunctioning of both actuators is damage to the actuator housing of the type which forms an abutment in the path of piston travel. In a military aircraft, this may result from an enemy projectile striking and locally deforming the housing. In other applications, the housing may be deformed by being accidentally struck with a tool or by loads being dropped on it. In either event, the housing is deformed inwardly so as to provide an abutment in the path of movement of the piston.

When a conventional piston strikes such an abutment, the piston will jam or the abutment provides a stop limiting further piston travel in that direction. In either event, because the pistons must move together, the movement of both pistons is impaired or prevented. Accordingly, for this type of damage, the safety advantages of redundancy are completely lost.

In a typical actuator construction, a connecting rod is joined to the piston and extends through an opening in a transverse member or transverse wall of the actuator housing. The motion of the piston is transmitted through the connecting rod to the output member. Another type of damage to one actuator which can result in loss of both actuators is damage to the connecting rod of the type which forms an abutment on the connecting rod. For example, in military aircraft this may be caused by an enemy projectile passing through the housing and deforming the connecting rod so as to form an abutment thereon. In this event, movement of the piston will cause the abutment to engage the peripheral region of the transverse member immediately surrounding the opening therein with consequent jamming of the actuator and loss of the advantages of redundancy.

SUMMARY OF THE INVENTION

The present invention restores the full advantages of redundancy to situations in which the housing or connecting rod of one actuator is damaged so as to limit piston travel. This is accomplished by utilizing a piston and a transverse member each of which reacts to contact with an abutment in such a manner as to prevent jamming of the actuator. Thus, the piston is responsive to striking the abutment for reducing a cross-sectional dimension of the piston sufficiently to allow the piston to move past the abutment in the chamber. Similarly, the transverse member is responsive to the abutment striking the transverse member for increasing a cross-sectional dimension of the opening in the transverse member sufficiently to allow the abutment to move through the opening. This prevents jamming of the damaged actuator so that the actuator which has not been damaged can continue to operate the control surface of the aircraft or other member without substantial interference from the damaged actuator.

The piston and the transverse member of this invention can be used in combination or independently of each other. However, for maximum safety they should be used together.

The piston and transverse member of this invention can be advantageously used in any system where the piston must be capable of a full range of movements even after the housing of the actuator has been damaged. Although the piston is particularly adapted for use in a redundant aircraft control system, its use is not limited to this field.

The cross-sectional dimension of the piston and of the opening in the transverse member can be altered in response to striking the abutment by breaking off the peripheral portion of the piston or transverse member which contacts the abutment. A conventional piston and transverse member will not break when they contact the abutment. The piston and transverse member of this invention have outer and inner frangible peripheral portions, respectively, which will break when they forcibly contact the abutment. However, the frangible portions are sufficiently strong to withstand the forces encountered in normal operation of the actuator.

The peripheral portions may be made frangible in different ways. Similar weakening concepts may be applied to the piston and the transverse member. One preferred way to weaken the peripheral portion is to employ slots and/or lines of score.

A seal is normally provided around the outer periphery of the piston and around the inner periphery of the transverse member. It is necessary, therefore, to integrate the seal and the seal retaining structure within the frangible peripheral portion. With the present invention, this is accomplished by providing first and second peripheral flanges which are spaced apart axially to define a peripherally extending seal groove. The seal is positioned in the seal groove. The frangible peripheral portion includes portions of the flanges.

Each of the flanges may include a plurality of frangible segments. In a preferred construction, each of the flanges has a plurality of radially extending slots and a circumferentially extending line of score with an adjacent pair of slots and a segment of the line of score defining one of the segments. Thus, in this particular construction, the peripheral portion is weakened by the slots, the line of score, and by the flanges themselves which are of lesser axial dimension than other portions of the piston.

In use, an outer face of the piston and the transverse member contacts the abutment. To assure that the frangible peripheral portion contacts the abutment at the periphery of the frangible portion, a circumferentially extending rib can advantageously be provided near the periphery of the flange. This rib projects outwardly so that it will be the first portion of the piston to contact the abutment. The rib assures that the force will be applied through a maximum length moment arm.

To facilitate manufacture, the line of score preferably is in the outer face of the flange. In addition to weakening the flange, the line of score provides a known line along which failure will occur.

Another feature of the invention is that the flanges structurally fail in sequence. To assure that the flange which first contacts the abutment will completely fail prior to being supported by the other flange, the seal groove has a larger axial dimension than the axial or radial dimension of the frangible segments. Progressive failure such as this can be obtained at a lower force level than if the entire composite, i.e., both the flanges and the seal were to be failed simultaneously.

To assure that fluid will not leak past the seal, the seal groove should extend radially in both directions from the bottom or end wall of the slots. Another function of seal is that it tends to retain at least some of the broken frangible segments which first contact the abutment rather than allowing the broken segments to move freely within the housing. The reason for this is that the abutment tends to force at least some of the segments deeply into the seal and to permanently deform the seal so that it has some ability to retain the segments.

The invention can best be understood by reference to the following description taken in connection with the accompanying illustrative drawing.

BRIEF DESCRIPTION OF THE DRAWING

FIG. 1 is a partially schematic sectional view of one form of actuator system constructed in accordance with the teachings of this invention.

FIG. 2 is a fragmentary, sectional view showing a portion of one actuator with an abutment in the path of movement of the piston.

FIG. 3 is a sectional view taken along line 3—3 of FIG. 1.

FIG. 4 is an enlarged fragmentary, front elevational view of a portion of the frangible piston.

FIG. 5 is a fragmentary sectional view taken generally along line 5—5 of FIG. 4 showing the housing and piston.

FIG. 6 is an enlarged fragmentary sectional view of a portion of a piston as it approaches an abutment formed in the housing.

FIG. 7 is a fragmentary sectional view similar to FIG. 6 showing the initiation of structural failure of the first flange to contact the abutment.

FIG. 8 is a partially schematic, sectional view of another form of actuator system constructed in accordance with the teachings of this invention.

FIG. 9 is an enlarged fragmentary sectional view taken on an axial plane and showing a portion of one of the actuators.

FIG. 10 is an end elevational view of one of the transverse members of the actuator system.

FIG. 11 is an enlarged fragmentary front elevational view of a portion of the frangible transverse member.

FIG. 12 is a fragmentary sectional view showing how the inner peripheral region of the frangible transverse member is broken away by an abutment formed on the connecting rod.

DESCRIPTION OF THE PREFERRED EMBODIMENT

FIG. 1 shows an actuator system 11 for positioning an output member in the form of a control surface 13 of an airplane. It should be understood that the actuator system 11 is not limited for use with control surfaces or with aircraft; however, it is particularly adapted to such use.

In the embodiment illustrated, the actuator system 11 includes a pair of identical actuators 15 and 17 controlled by hydraulic controls 19 and 21, respectively. Except as specifically noted herein, the actuators 15 and 17 are identical and portions of the actuator 17 corresponding to portions of the actuator 15 are designated by corresponding reference numerals followed by the letter a.

The actuator 15 includes a housing 23 defining therein a cylindrical chamber 25. The housing 23 has a peripheral wall 27 having radial ports 29 and 31 therein. The ports 29 and 31 are connected to the hydraulic controls 19 by conduits 33 and 35, respectively. The hydraulic controls 19 include the necessary conventional components for controlling the flow of hydraulic fluid to and from the ports 29 and 31.

The actuator 15 also includes a piston 37 integrally joined to a connecting rod 39. The piston 37 has opposed, pressure responsive faces 38 and 40. One end of the connecting rod 39 projects through an end wall 41 of the housing 23 and is appropriately connected as by suitable mechanical means to the control surface 13. The other end of the connecting rod 39 projects through an end wall 43 of the housing 23 and through the end wall 41a of the housing 23a and is joined to the piston 37a. Although various constructions could be employed, in the embodiment illustrated, the connecting rod 39 includes a sleeve 45 joined to the piston 37a and to a reduced diameter core section 47 of the connecting rod 39.

A seal 49 is retained by the piston 37. In addition, annular seals 51 are provided as necessary to prevent leakage from the actuator 15.

The piston 37 is shown more fully in FIGS. 3-5. The piston 37a is identical to the piston 37. The piston 37 includes a body portion 53 (FIG. 5) and a pair of circumferentially extending, annular flanges 55 and 57. The flanges 55 and 57 are axially spaced apart to define a groove 59 for retaining the seal 49. Each of the flanges 55 and 57 has a plurality of radially extending, circumferentially spaced slots 61 which open at the outer peripheries of the flanges. The slots 61 are preferably equally spaced circumferentially and identical. Each of the slots 61 terminates radially inwardly in an end wall 63 (FIGS. 4 and 5), and the seal groove 59 has an annular end wall 65. Each of the end walls 63 lies radially outwardly of the adjacent portion of the end wall 65.

Each of the flanges 55 and 57 has a line of score 67 on the outer faces thereof. In the embodiment illustrated, the score lines 67 are circular and extend between and interconnect adjacent slots 61. The expression line of score as used herein refers to any thickness reduction of the material regardless of the method by which such thickness reduction may be obtained.

In the embodiment illustrated, the slots 61, and the line of score 67 constitute weakened regions which define a plurality of circumferentially spaced segments 69 in each of the flanges 55 and 57. Preferably the segments 69 of the flanges 55 are axially aligned with the segments of the flange 57. In the embodiment illustrated, the segments 69 are identical. The segments 69 are frangible in the sense that they can be broken off of the piston 37.

Each of the flanges 55 and 57 has an annular rib 71. Each of ribs 71 projects axially outwardly of the adjacent regions of the associated face of the piston 37. The ribs 71 are interrupted by the slots 61 as shown in FIG. 4. The radial outer corners of the flanges 55 and 57 have small radii and are relatively sharp.

The seal 49 is preferably constructed of a plastic material such as polytetrafluoroethylene. The seal 49 must prevent leakage past the periphery of the piston 37 and also prevent leakage through the slots 61.

The plastic material of the seal 49 will not stretch significantly and for this reason would be very difficult to install in the seal groove 59 if it were not split to allow circumferential expansion. In the embodiment illustrated, the seal 49 includes a pair of split sealing rings 73 with the splits of the two rings being circumferentially offset to prevent leakage through the seal 49. Alternatively, a split sealing ring of special configuration which facilitates installation and which also prevents leakage therethrough may be employed in lieu of the two sealing rings 73. A spring 75 of generally annular configuration is positioned in the groove 59 between the end wall 65 and the inner peripheral surface of the sealing rings 73 to urge the latter radially outwardly into sealing engagement with the peripheral wall 27.

In use, the hydraulic controls 19 and 21 control the flow of fluid to and from the chambers 25 and 25a to thereby position the pistons 37 and 37a. The hydraulic controls 19 and 21 are coordinated so that they tend to impart identical increments of movement to the pistons 37 and 37a. As the pistons 37 and 37a move, they also move the connecting rod 39 which appropriately positions the control surface 13.

If the system associated with the actuator 15 should fail, for example, through a loss of pressure in the conduit 33, the hydraulic controls 19 would no longer be able to drive the piston 37. However, the hydraulic controls 21 would continue to position the piston 37a and the control surface 13 in accordance with pilot demands.

If the peripheral wall 27 is radially inwardly deformed as by a projectile, an abutment 77 (FIGS. 6 and 7) is formed integrally with the peripheral wall. In the embodiment illustrated, the abutment 77 is in the form of a dimple and would be round in plan; however, obviously the specific shape of the abutment 77 will vary depending upon various factors such as the nature of, and the force with which, the object strikes the peripheral wall 27.

Assuming that the hydraulic controls 19 are operated to move the piston 37 to the left toward the abutment 77, the rib 71 contacts the abutment and a force is applied to one or more of the segments 69 tending to break such segments generally along the line of score 67. Because the rib 71 strikes the abutment 77 at a location spaced from the line of score 67, some mechanical advantage is obtained which is useful in breaking the segments 69.

As the piston 37 continues to move to the left, the broken segment 69 is forced into the seal 49 thereby permanently deforming the plastic of the seal. The broken segment 69 tends to imbed in the seal 49 and tends to be retained thereby.

As movement of the piston 37 to the left progresses, one or more of the segments 69 of the flange 55 contacts the abutment 77 and are broken thereby in much the same manner as the segments of the flange 57. Because the axial dimension of the seal 49 is greater than the axial and radial dimensions of the segment 69, the segments of the flange 57 are completely broken before the segments of the flange 55 are broken.

FIG. 2 is somewhat similar to FIG. 6 except that in FIG. 2 the abutment 77 is formed on the other side of the piston 37. In this event, the segments of the flange 55 are broken before the segments of the flange 57.

FIGS. 8–12 show an actuator system 111 which represents a second embodiment of this invention. The primary difference between the actuator system 11 and the actuator system 111 is that the latter includes identical transverse members or end walls 181 and 183 each of which has a frangible inner periphery 185. One advantage of the actuator system 111 is that damage to the connecting rod 139 through the formation of an abutment 187 (FIG. 12) will not jam the actuator because the frangible inner peripheries 185 are breakable to accommodate the abutment 187.

Portions of the actuator system 111 coresponding to the actuator system 11 are designated by corresponding reference numerals preceded by the numeral 1. Except as expressly shown or described herein, the actuator system 111 is identical to the actuator system 11.

The actuator system 111 includes actuators 115 and 117 which are identical to each other and which are arranged in side by side relationship. The actuator 115 includes hydraulic controls 119, a housing 123 which defines a chamber 125 in which a frangible piston 137 is slidably mounted. The frangible piston 137 is identical to the frangible piston 37 described with reference to FIGS. 1–7. The frangible piston 137 is joined to a connecting rod 139 which, in the embodiment illustrated, is of tubular construction.

Similarly, the actuator 117 has a frangible piston 137a which is joined to a connecting rod 139a. The connecting rods 139 and 139a are suitably interconnected by a member 189 which in turn is drivingly connected to an output member such as a control surface 113 of an aircraft (not shown). Thus, the member 189 assures that the frangible pistons 137 and 137a move together.

In the embodiment illustrated, the transverse members or walls 181 and 183 form part of the housing 123. The end wall 143 of the housing 123 is completely closed in that the connecting rod 139 does not pass therethrough. The transverse members 181 and 183 are mounted in a counterbore 190 formed in the peripheral wall 127 of the housing. The transverse members 181 and 183 are axially spaced by a ring-shaped spacer 191. If fluid leaks past the transverse member 181 into the space between the transverse members, it can flow to return through an aperture 193 in the spacer 191 and a return port 195 in the peripheral wall 127. A threaded retainer 197 is received within the peripheral wall 127 and bears against the transverse member 183 to retain the transverse members and the spacer 191 in the position shown in FIG. 9. The transverse members 181 and 183 or either of them may be positioned and retained in place in various different ways, and the arrangement shown in FIG. 9 is merely illustrative.

The transverse member 181 is of annular configuration. The construction of the frangible portion 185 of the transverse member 181 is virtually identical to the construction of the frangible portion of the piston 37 (FIGS. 1–7) except that the former is on an inner periphery of a member and the latter is on the outer periphery of a member. The transverse member 181 includes a body portion 199 (FIG. 9) defining a groove for retaining a seal 201 which seals the transverse member to the peripheral wall 127. The transverse member 181 also includes a pair of circumferentially extending annular flanges 203 and 205. The flanges 203 and 205 are axially spaced apart to define a groove 207 for retaining a seal 149. Each of the flanges 203 and 205 has a plurality of radially extending, circumferentially spaced slots 209 (FIG. 11) which open at the inner peripheries of the flange. The slots 209 are preferably identical and equally spaced circumferentially. Each of the slots 209 terminates radially inwardly in an end wall 211. Each of the end walls 211 lies radially inwardly of the adjacent portion of an end wall 213 (FIG. 9) of the groove 207.

Each of the flanges 203 and 205 has a line of score 215 on the outer faces thereof. In the embodiment illustrated, the score lines 215 are circular and extend between and interconnect the adjacent slots 211. The slots 209 and the line of score 211 define a plurality of circumferentially spaced segments 217 which can be broken along the line of score 215.

Each of the flanges 203 and 205 has an annular rib 119. Each of the ribs 219 projects axially outwardly of the adjacent regions of the associated face of the transverse member 181. The seal 149 is preferably identical to the seal 49 (FIGS. 1–7) except that it seals along the connecting rod 139 rather than along the peripheral wall of the housing. The seal 149 is urged radially inwardly against the connecting rod 139 by a spring 175. Thus, the frangible portions of the transverse members 181 and 183 are simply inside out versions of the flangible portion of the piston 37.

In the actuator system 111, both the piston 137 and the transverse member 181 have frangible peripheral regions. It is necessary to prevent the frangible peripheral regions of the piston 137 and the transverse member 181 from coming into forcible contact when the piston bottoms out against the transverse member. This can be accomplished by providing appropriate stops for the piston 137. In the embodiment illustrated, it is provided by an annular protrusion 221 on the face of the transverse member 181. The annular protrusion 221 is on the nonfrangible body portion 199 of the transverse member 181 and it is adapted to engage the nonfrangible body portion 151 of the piston 137. The radial dimensions of the frangible segments of the piston and transverse member can be equal or different from each other.

With reference to FIG. 12, the connecting rod 139 may become damaged by a projectile which passes through the housing and through the connecting rod. This forms an abutment (not shown) on the housing 123 and the abutment 187 on the connecting rod 139. When the piston 137 contacts the abutment on the housing 123, the piston 137 will fracture in the manner described in connection with FIGS. 1–7. When the abutment 187 contacts the transverse member 181, the flanges 203 and 205 fracture in the same manner as the flanges 55 and 57 of the piston 37 (FIGS. 1–7). The transverse member 183 will be similarly fractured by the abutment 187.

Although this invention has been described with reference to a system having multiple actuators, it should be understood that it is equally applicable to a system having only one actuator and some other means to drive the member of the aircraft if the actuator fails. For example, such means may include a mechanism providing for manual control of the member.

Although exemplary embodiments of the invention have been shown and described, many changes, modifications and substitutions thereof may be made by one having ordinary skill in the art without necessarily departing from the spirit and scope of this invention.

I claim:

1. An actuator comprising:
   a housing including a transverse member, said transverse member having an opening therein, said housing having a chamber therein;
   a piston member movable in said chamber, said chamber being adapted to receive fluid under pressure to move said piston member in said chamber;
   a connecting rod joined to said piston member and extending through said opening of said transverse member;
   at least one of said members having a frangible peripheral region; and
   said frangible peripheral region including at least one weakened region defining a plurality of segments which can be broken off of said one member.

2. An actuator as defined in claim 1 wherein said one member is said piston member and said peripheral region is the outer peripheral region of said piston member.

3. An actuator as defined in claim 2 wherein said transverse member has at least one weakened region defining a frangible inner peripheral region immediately surrounding said connecting rod.

4. An actuator as defined in claim 1 wherein said one member is said transverse member and said peripheral region is an inner peripheral region.

5. A frangible construction as defined in claim 1 wherein said weakened region includes circumferentially spaced slots in said peripheral region.

6. A frangible construction as defined in claim 1 wherein said weakened region includes a line of score in said peripheral region.

7. A frangible construction as defined in claim 1 wherein said peripheral region includes flanges defining a seal groove, said weakened region includes at least one slot in said peripheral region, said seal groove adjacent said slot having a greater radial dimension than said slot.

8. A frangible construction as defined in claim 1 wherein said peripheral region defines a seal groove and the axial dimension of said seal groove is greater than the axial dimension of any of said segments.

9. A frangible construction as defined in claim 1 wherein said peripheral region includes axially spaced circumferentially extending flanges and said weakened region includes generally radial slots in each of said flanges and a line of score extending circumferentially in each of said flanges and substantially intersecting said slots, said slots opening at the periphery of the associated flange, each of said segments being defined by an adjacent pair of said slots and a zone of said line of core extending generally between said adjacent pair of slots.

10. A frangible construction as defined in claim 9 wherein the line of score in each of said flanges is on the outer face thereof and the axial space between said flanges defines a seal groove, said seal groove has a greater radial dimension that said slots, each of said flanges has a circumferentially extending rib located adjacent the periphery of the associated flange, each of said ribs projects axially outwardly of the associated flange whereby the ribs define the outermost points of said flanges in the axial direction, and the axial dimension of said seal groove is greater than the axial dimension of any of said segments.

11. An actuator system for moving a member comprising:
a first actuator;
said first actuator including a housing having a chamber and a piston movable in said chamber, said chamber being adapted to receive fluid under pressure to move said piston in said chamber;
first means for drivingly interrelating said piston and the member so that said piston can cause movement of the chamber;
second means for causing said member to move;
said housing having a peripheral wall which is deformable inwardly in response to a blow to define an abutment in said chamber in the path of movement of said piston; and
at least a peripheral region of said piston being frangible so that such region of the piston breaks in response to said piston striking said abutment whereby the formation of said abutment will not limit the movement of said piston and said second means is not prevented from causing movement of the member.

12. An actuator system as defined in claim 11 wherein said second means includes a second actuator, said second actuator includes a housing and a piston movable in said housing, said means drivingly interrelating said pistons so that they are movable together and substantially held against relative linear motion.

13. An actuator system as defined in claim 11 wherein said peripheral region includes weakened regions defining a plurality of segments which can be broken off of the piston.

14. An actuator system as defined in claim 13 wherein said segments are arranged in a plurality of axially spaced circumferentially extending rows, said rows being spaced axially sufficiently to allow a segment of one of said rows to break completely when it strikes said abutment before an adjacent segment of the adjacent row is broken.

15. An actuator system as defined in claim 11 wherein said piston includes first and second peripheral flanges, said first and second flanges being axially spaced to at least partially define a peripherally extending seal groove, at least portions of both of said flanges defining said peripheral region, said actuator system also including a peripherally extending seal in said seal groove.

16. An actuator as defined in claim 15 wherein each of said flanges has a plurality of circumferentially spaced slots therein.

17. An actuator as defined in claim 15 including a line of score in at least one of said flanges to weaken said one flange.

18. An actuator as defined in claim 15 wherein each of said flanges has generally radially extending slots and a line of score extending circumferentially to substantially interconnect said slots, each of said slots opening at the periphery of the associated flange.

19. An actuator system as defined in claim 18 wherein the line of score in each of said flanges is on the outer face thereof, said seal groove terminates radially inwardly of said slots, the axial dimension of said seal groove being greater than the axial dimension of either of said flanges.

20. An actuator system as defined in claim 11 wherein said piston has a circumferentially extending rib located adjacent the periphery of the piston, said rib projecting axially outwardly whereby the rib is adapted to make initial contact with said abutment.

21. An actuator system for moving an aircraft control surface comprising:
first and second actuators;
said first actuator including a housing having a chamber and a piston movable in said chamber, said chamber being adapted to receive fluid under pressure to move said piston in said chamber;
means for drivingly interrelating said piston and said second actuator and the control surface so that either said piston or said second actuator can move the control surface;
said housing having a peripheral wall which is deformable inwardly to define an abutment in said chamber in the path of movement of said piston; and
said piston including means responsive to said piston striking said abutment for reducing a cross sectional dimension of the piston sufficiently to allow said piston to move past said abutment in said chamber whereby the formation of said abutment will not jam said piston and said second actuator is not prevented from driving the control surface.

22. An actuator system for moving a member comprising:
a first actuator;
said first actuator including a housing having a chamber and a piston movable in said chamber, said chamber being adapted to receive fluid under pressure to move said piston in said chamber;
said housing having a transverse member with an opening therein;
a connecting rod joined to said piston and extending through said opening;
first means for drivingly interrelating said connecting rod and the member so that said piston can cause the member to move;
second means for causing said member to move;
said connecting rod being deformable in response to a blow to define an abutment engageable with the transverse member; and
at least an inner peripheral region of said transverse member being frangible so that such peripheral region breaks in response to said abutment striking said transverse member whereby the formation of said abutment will not limit the movement of said piston and said second means is not prevented from causing movement of the member.

23. An actuator system as defined in claim 22 wherein said peripheral region includes weakened regions defining a plurality of segments which can be broken off of the transverse member.

24. An actuator system as defined in claim 22 wherein said transverse member includes first and second peripheral flanges, said first and second flanges being axially spaced to at least partially define a peripherally extending seal groove, at least portions of both of said flanges defining said peripheral region, said actuator system also including a peripherally extending seal in said seal groove.

25. An actuator as defined in claim 24 wherein each of said flanges has a plurality of circumferentially spaced slots therein.

26. An actuator as defined in claim 24 including a line of score in at least one of said flanges to weaken said one flange.

27. An actuator system for moving an aircraft control surface comprising:
   first and second actuators;
   said first actuator including a housing having a chamber and a piston movable in said chamber, said chamber being adapted to receive fluid under pressure to move said piston in said chamber;
   said housing having a transverse member with an opening therein;
   a connecting rod joined to said piston and extending through said opening;
   means for drivingly interrelating said connecting rod and said second actuator and the control surface so that either said piston or said second actuator can move the control surface;
   said connecting rod being deformable to define an abutment engageable with said transverse member; and
   said transverse member including means responsive to said abutment striking said transverse member for increasing a cross sectional dimension of said opening sufficiently to allow said abutment to move through said opening whereby the formation of said abutment will not jam said rod against said transverse member and said second actuator is not prevented from driving the control surface.

28. An actuator as defined in claim 27 wherein said housing has a peripheral wall which is deformable inwardly to define a second abutment in said chamber in the path of movement of said piston and said piston includes means responsive to said piston striking said second abutment for reducing a cross sectional dimension of the piston sufficiently to allow said piston to move past said second abutment in said chamber whereby the formation of said second abutment will not jam said piston and said second actuator is not prevented from driving the control surface.

29. A system for moving an element comprising:
   a first control apparatus including inner and outer relatively movable members;
   means for causing the relative movement between said member to cause movement of said element;
   second means for causing movement of said element;
   at least one of said members being deformable in response to a blow to define an abutment tending to inhibit said relative movement between said members; and
   the other of said members including a peripheral region which is frangible so that said peripheral region breaks in response to forcible engagement between said abutment and said peripheral region whereby the formation of said abutment will not prevent relative movement between said members beyond said abutment and said second means is not prevented from causing movement of said element.

30. A system as defined in claim 29 wherein said peripheral region includes weakened regions defining a plurality of segments which can be broken off said other member, said peripheral region having a plurality of circumferentially spaced slots therein at least partially defining at least some of said segments.

* * * * *